Feb. 5, 1952  J. G. WORDEMAN  2,584,244
FULCRUM TYPE CAN OPENER
Filed Feb. 15, 1946
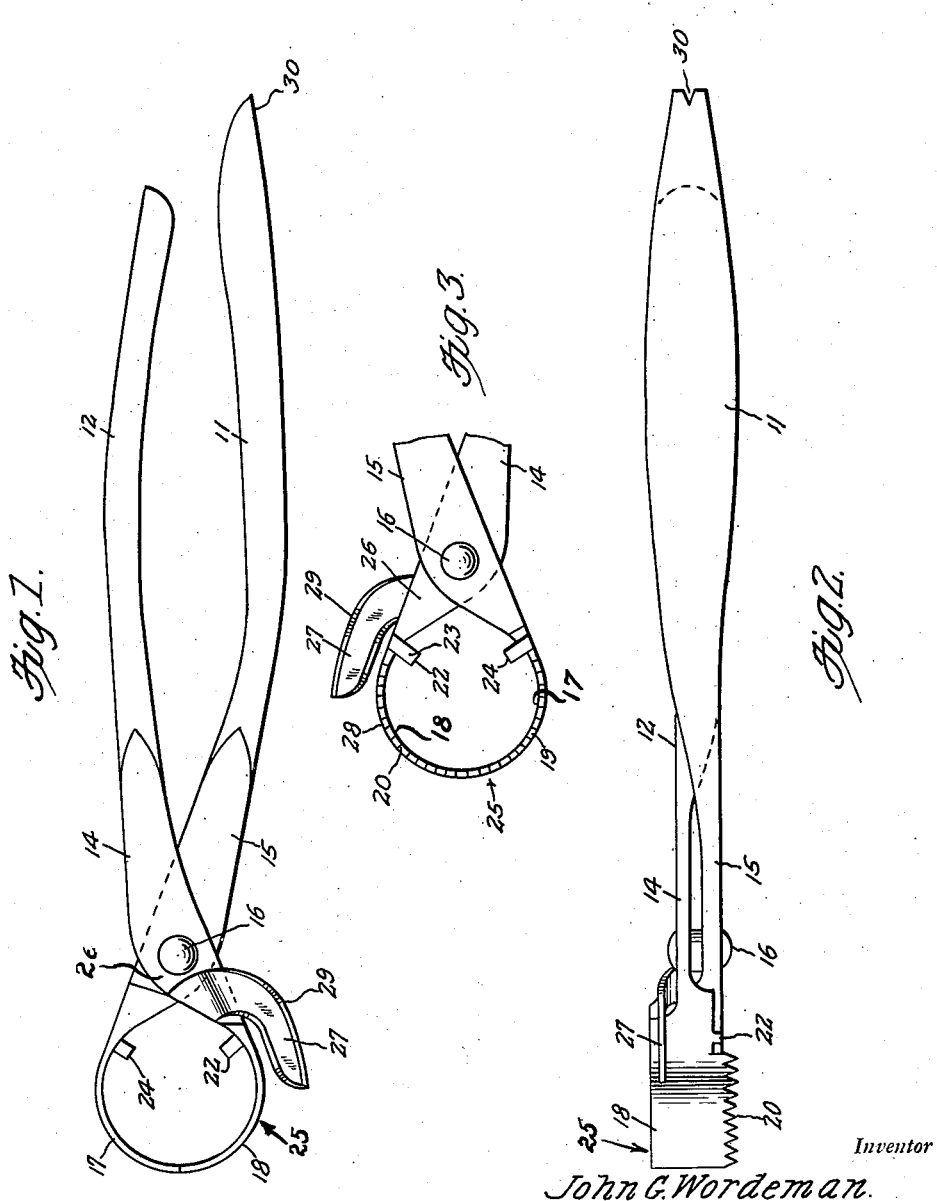
Inventor
John G. Wordeman.
By Clarence A. O'Brien
and Harvey B. Jacobson
Attorneys

Patented Feb. 5, 1952

2,584,244

UNITED STATES PATENT OFFICE 2,584,244

FULCRUM TYPE CAN OPENER

John G. Wordeman, Martin, S. Dak.

Application February 15, 1946, Serial No. 647,743

2 Claims. (Cl. 30—22)

This invention relates to new and useful improvements in culinary utensils and the primary object of the present invention is to provide a pair of pivotally connected levers having semi-cylindrical, thin, flexible jaws on their shanks that may be curved to a desired radius for rocking upon a container top and which jaws may be distorted to permit a container top to be removed from between one of the jaws and a blade carried by one of the levers below the said one of the jaws.

Another important object of the present invention is to provide a pair of jaws coacting with a blade for selectively gripping and releasing a container top.

Other features and advantages will become more readily apparent from the following description and the accompanying illustrative drawings in which:

Figure 1 is a top plan view of the device,

Figure 2 is a side elevational view of Figure 1, and

Figure 3 is a fragmentary bottom plan view of Figure 2.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention in its entirety and 11 indicates one lever handle and 12 another like handle, both flattened at the outer ends 14 and 15 to form shanks which are pivoted together at 16. The shank 15 terminates in a semi-cylindrical jaw 17 and the shank 14 in a semi-cylindrical jaw 18, both of which jaws are provided on one side with teeth 19 and 20 respectively and both of which jaws are provided on their ends 21 and 22 adjacent the said shanks with inwardly extending lugs 23 and 24 which are adapted to form bottle cap removers, the bottle mouth being held within the cylinder 25 formed by the said jaws 17 and 18 when its cap is to be removed. The jaw 14 has secured thereto at the shank end 26 an arcuate cutter 27 adapted to be used in connection with the outer periphery 28 of the jaw 18 as a can opener and as a fish-splitting cutter. The outer edge 29 of the member 27 is also sharpened to form a cutter by means of which fish heads and tails may be cut from the body thereof and also for the purpose of cutting off fins from the fish and may be used as a blade to cut the fish into pieces when desired.

From the foregoing it will be seen that the above described invention forms a culinary article which may be used for many purposes in the kitchen whereby a housewife can save the trouble of changing from one implement to another in cleaning fish, for instance, as the same implement will scale, split, clean and cut the same apart when desired. The same tool forms a can opener and a bottle cap remover. The terminal of the handle 11 also forms a tack remover 30.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. A can opener comprising upper and lower levers having flattened shanks, the flattened shanks of said levers being pivoted together, a relatively thin and flexible concavo-convexed jaw integrally formed with the shank of each of said levers and arranged to form a substantially cylindrical member, the jaw of the upper lever opposing the jaw of the lower lever, said jaws having free edges abutting each other, and an arcuate cutter carried by the shank of said upper lever and having a beveled edge spaced from and underlying the convexed surface of the jaw of said upper lever, said jaws being distorted upon movement of said levers toward each other to curve the jaw of said upper lever and permit a container top to be released from between the cutter and the jaw of the upper lever.

2. A can opener comprising upper and lower levers pivoted together, a relatively thin and flexible arcuate member carried by the lower lever and being upwardly curved, a blade mounted on said lower lever and underlying the member, and means carried by the upper lever for engaging and distorting the member to permit a container top to be released from between the blade and the member.

JOHN G. WORDEMAN.

REFERENCES CITED

The following references are of record in the file of this patent:

UNITED STATES PATENTS

| Number | Name | Date |
| --- | --- | --- |
| 292,710 | Van Slyke | Jan. 29, 1884 |
| 717,206 | Jacoby | Dec. 30, 1902 |
| 752,118 | Stearns | Feb. 16, 1904 |
| 1,171,241 | Potter | Feb. 8, 1916 |
| 1,451,594 | Smookler | Apr. 10, 1923 |
| 1,475,301 | Hartleb | Nov. 27, 1923 |
| 1,661,333 | Gurnett | Mar. 6, 1928 |
| 1,812,705 | Mario | June 30, 1931 |
| 2,252,406 | O'Brien | Aug. 12, 1941 |